United States Patent [19]

Marsh et al.

[11] Patent Number: 4,713,233
[45] Date of Patent: Dec. 15, 1987

[54] SPRAY-DRIED INORGANIC OXIDES FROM NON-AQUEOUS GELS OR SOLUTIONS

[75] Inventors: Gary B. Marsh, Pittstown; Anthony J. Fanelli, Rockaway; John N. Armor, Morris Plains; Patrick M. Zambri, Montclair, all of N.J.

[73] Assignee: Allied Corporation, Morris Township, Morris County, N.J.

[21] Appl. No.: 910,929

[22] Filed: Sep. 24, 1986

Related U.S. Application Data

[63] Continuation of Ser. No. 717,931, Mar. 29, 1985, Pat. No. 4,649,037.

[51] Int. Cl.$^4$ ............................................. C01G 25/02
[52] U.S. Cl. .................................... 423/608; 423/266; 423/593; 502/351
[58] Field of Search ..................... 502/355, 351, 349; 423/338, 625, 608, 593, 266

[56] References Cited

U.S. PATENT DOCUMENTS

| | | | |
|---|---|---|---|
| 2,467,089 | 4/1949 | Marisic et al. | 423/608 |
| 3,268,349 | 8/1966 | Brixner et al. | 423/593 |
| 3,514,252 | 5/1970 | Levy et al. | 423/608 |
| 3,984,524 | 10/1976 | Alexandrov et al. | 423/266 |
| 4,053,565 | 10/1977 | Krekeler et al. | 423/338 |
| 4,190,457 | 2/1980 | McDaniel | 423/338 |
| 4,360,598 | 11/1982 | Otagiri et al. | 423/766 |
| 4,469,816 | 9/1984 | Armor et al. | 502/333 |
| 4,504,681 | 3/1985 | Armor | 502/355 |
| 4,537,873 | 8/1985 | Kato et al. | 502/349 |
| 4,554,211 | 11/1985 | Arika et al. | 423/338 |
| 4,595,578 | 6/1986 | Cohen et al. | 423/338 |
| 4,639,356 | 1/1987 | O'Toole et al. | 423/766 |

*Primary Examiner*—Andrew H. Metz
*Assistant Examiner*—A. McFarlane
*Attorney, Agent, or Firm*—Ernest D. Buff; Gerhard H. Fuchs

[57] ABSTRACT

Inorganic metal oxides having high surface area and pore volume are prepared by spray drying. The admixture which is spray dried to yield the metal oxides is produced from reactants comprising at least one hydrolyzable metal compound, a sufficient amount of water to at least partially hydrolyze the metal compound and an organic solvent. The admixture is supplied as a plurality of droplets to a reaction zone operated under conditions of temperature and pressure below the critical temperature and pressure of the reactants but sufficient to produce a product comprising metal oxide powders and a gas comprising organic solvent vapors. The powders are separated from the gas in a known fashion and collected. Spray drying of non-aqueous systems unexpectedly produces metal oxides having properties generally intermediate conventionally produced oxides and aerogels.

1 Claim, 13 Drawing Figures

SPRAY-DRIED INORGANIC OXIDES FROM NON-AQUEOUS GELS OR SOLUTIONS

This application is a continuation of application Ser. No. 717,931, filed Mar. 29, 1985, now U.S. Pat. No. 4,649,037.

BACKGROUND OF THE INVENTION

An inorganic hydrated oxide, precipitated from an aqueous solution of a corresponding metal cation, washed and then dried (in air or under a vacuum) yields a porous oxide product. The porous oxide product, produced from the gel (the precipitated inorganic hydrated oxide in the solvent) by removing the solvent (water) under conditions of temperature and pressure less than the supercritical conditions (at or above which the solvent would exist as a supercritical fluid), has been given the name "xerogel" by A. Fruendlich (*Colloid and Capillary Chemistry*, Dutin, N.Y., 1923). However, the textural characteristics (pore volume and surface area) of the xerogel are inferior to the textural characteristics of the oxide in the gel before the elimination of the solvent. It is theorized that the vaporization of the water creates a vapor-liquid interface inside the pores of the oxide particles and the resulting surface tension is responsible for a partial collapse of the pores. Nonetheless, xerogels are very useful products and have been the subject of a number of patents. For example, U.S. Pat. No. 4,226,743 (Seese et al.) describes a process for the production of a silica-alumina hydrogel catalyst, U.S. Pat. No. 3,383,172 (Biegler et al.) describes a process for the production of silica from an aqueous suspension, and U.S. Pat. No. 3,704,147 (Hardy et al.) describes a process for the production of inorganic oxides such as zirconia or alumina from an aqueous suspension.

It is known to produce the hydrated inorganic oxides by hydrolysis of metal alkoxides. The hydrated oxides which precipitate are removed from the aqueous suspension by, for example, filtering or centrifugation, and are subsequently washed and dried in ovens to yield the oxide. Such processes have been described in "Preparation, Characterization, and Comparison of Properties of Alumina Catalysts," *J. Catal.*, 89, 560–563 (1984), Matijevic, Egon, "Monodispersed Metal (Hydrous) Oxides—A Fascinating Field of Colloid Science," *Acc. Chem. Res.*, 14, pp. 22–29 (1981), and Barringer, E. et al., "Processing Monosized Powders," *Ultrastructure Processing of Ceramics, Glasses, and Composites*, John Wiley & Sons, New York, N.Y., pp. 315–333.

The step of drying solutions or suspensions to produce particulate materials has been accomplished by a variety of processes. Such processes include oven drying, flame pyrolyzing, and spray drying. Of these processes, spray drying has received considerable attention. Spray drying as defined herein includes flash drying and is a technique in which a solution or suspension is supplied to a heated chamber as a plurality of uniform, fine droplets to remove the solvent. The product produced therefrom is ordinarily spherical and finely divided. The process of spray drying aquagels is disclosed in U.S. Pat. No. 4,226,743 (Seese et al.); U.S. Pat. No. 4,389,385 (Ramsey); U.S. Pat. No. 4,407,967 (Luks); U.S. Pat. No. 4,297,163 (Thomas); and U.S. Pat. No. 2,856,268 (Young).

The process of spray drying aquagels formed from the hydrolysis of metal alkoxides to produce xerogels is also known. U.S. Pat. No. 4,407,734 (Denton et al.), U.K. Pat. No. 1,567,003 (Ramsey) and a sales brochure from Conoco entitled "Catapal®SB Alumina" describes such processes. The pore volume and surface area of alumina xerogels prepared by these techniques are generally less than about 1.7 $cm^3/g$ and 260 $m^2/g$, respectively.

Modifications to the basic processes for producing xerogels have been employed to prepare inorganic products having higher pore volume and surface area. One such method involves the use of additives in the gel. For example, control and enlargement of the pore volume of alumina by the addition of water-soluble polymers is described in *J. Catal.*, 1, 547 (1962). Incorporation of carbon black is disclosed in German Pat. No. 1,907,095, the addition of alcohol is disclosed in EPA No. 0050902, and the addition of polyethylene glycol is disclosed in U.S. Pat. No. 4,145,316. However, the pore volume and surface area of, e.g., alumina prepared using any of these aqueous techniques is generally less than about 2$cm^3/g$ and 300$m^2/g$, respectively.

An alternate approach employed to create high pore volume and surface area products is a process of evacuating the solvent from a gel under supercritical conditions. This process was developed, in part, and reported by Kistler (*J. Phys. Chem.*, 36, 1932, p. 52). Products produced by this process are classified as aerogels. Aluminum oxides produced by this process readily exhibit a pore volume above 2$cm^3/g$ and a surface area greater than about 400$m^2/g$. A detailed discussion of the method of preparing inorganic oxide aerogels is disclosed in S. J. Teichner et al., "Inorganic Oxide Aerogels," *Advances in Colloid and Interface Science*, Vol 5, 1976, pp. 245–73. The gel from which the aerogel is produced is either in the form of an aquagel or an alcogel (alcohol as the solvent).

We have discovered that the finely divided porous inorganic oxides can be produced in conventional spray drying apparatus, without the need for high pressures and temperatures by using organic solvents to produce a gel or solution. The pore volumes and surface areas of the spray dried xerogel products are unexpectedly improved as compared to xerogels produced from aquagels, and in some cases approach the textural characteristics of an aerogel.

SUMMARY OF THE INVENTION

Our invention is directed to a process of producing metal oxide powders which comprises:

(a) admixing reactants comprising an organic solvent, at least one hydrolyzable metal compound, and a sufficient amount of water to at least partially hydrolyze said hydrolyzable metal compound;

(b) supplying the admixture as a plurality of droplets to a heating zone operated under conditions of temperature and pressure below the critical temperature and pressure of the reactants but sufficient to produce a product comprising metal oxide powders, and a gas comprising organic solvent vapors;

(c) separating said product from said gas; and, (d) collecting the product.

The admixture is provided as a plurality of droplets by injecting the admixture into the heating zone or by supplying the admixture onto a spinning disk located in the zone to produce the droplets. The process is most preferably conducted in a closed cycle spray drying apparatus. The properties of the xerogel are unexpectedly superior to properties exhibited by xerogels produced by other known spray drying processes.

BRIEF DESCRIPTION OF THE DRAWING

The FIG. 1 is a schematic representation of an indirect fired, closed-cycle spray dryer used to carry out the process of our invention.

DETAILED DESCRIPTION OF THE INVENTION

Figure 1:
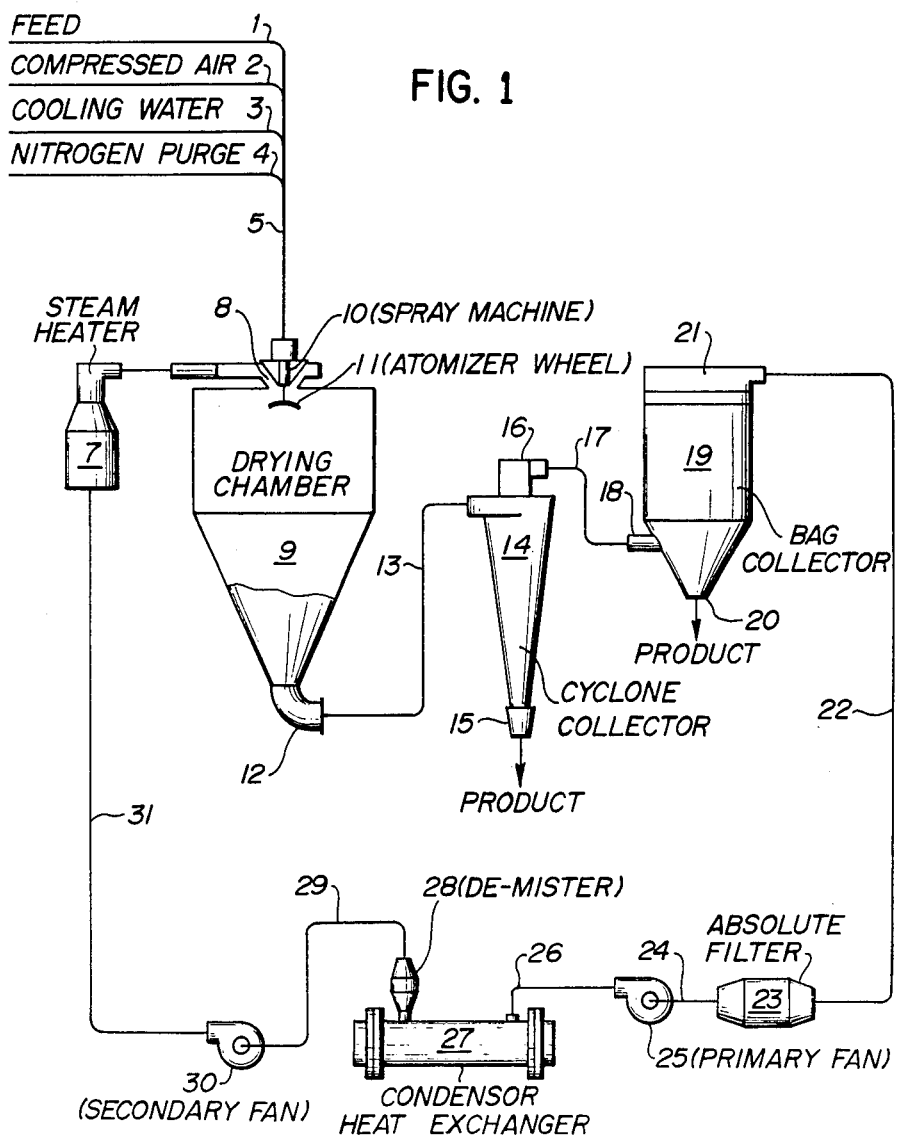

There are many applications which require ceramic powder having high pore volumes, large surface area, and small particle sizes. The powders produced by our invention can be used, for example, as pigments or thickeners, as filters, as binders, in the production of molded (cast) ceramic parts from dry powders or slips, and as catalysts and catalyst supports. For example, catalysts, such as polymerization catalysts, are presently formed on aerogel support materials, or on spray dried support materials from aquagels (e.g., Ketjen® B alumina support). Of the two support materials, the aerogel support materials appear to be far superior in some respects due to their high pore volume, high surface area and small particle size. However, they are far more costly to produce. Our materials offer the advantages associated with aerogel supports at a cost more closely related to aqueous spray dried materials.

The metal oxide powders of our invention exhibit a high pore volume, large surface area, small particle size, high flowability and a low degree of agglomeration. These properties have not heretofor been available from spray drying techniques. As used herein, the term metal oxide shall include simple metal oxide powders (e.g., $Al_2O_3$), metal oxide/hydroxide, metal oxide/alkoxide, or metal oxides having OH or OR [as surface hydroxy (OH), carboxyl or alkoxy (OR) groups, for example], and mixtures thereof such as mixed metal oxides (e.g., $MgAl_2O_4$). The term metal as used herein includes metals and non-metals. More specifically, the metals used to produce the metal oxide powders include aluminum, barium, calcium, lithium, potassium, magnesium, cerium, lanthanum, titanium, zirconium, chromium, zinc, gallium, silicon, antimony, bismuth, strontium, iron, lead, copper, yttrium, molybdenum, tungsten, tin and boron.

The powders of our process are produced from a solution or suspension comprising at least one hydrolyzable metal compound, an organic solvent and an amount of water sufficient to at least partially hydrolyze the hydrolyzable metal compound. An admixture of the above is supplied to a heating zone as a plurality of fine droplets to produce a product comprising metal oxide powders, and organic solvent vapors, the organic solvent vapors being subsequently removed to yield the product.

Hydrolyzable metal compounds are selected from the group consisting of organometallic compounds and colloidal suspensions of inorganic salts. Preferably, the hydrolyzable metal compound is an organometallic compound selected from the group of metal alkoxides, metal acetates, metal alkanoates, metal acetyl acetonates, metal carboxylates (mono- or di-), metal oxalates, metal citrates, or mixtures thereof. Most preferred hydrolyzable metal compounds include metal alkoxides, metal acetates, and metal acetyl acetonates.

The hydrolyzable metal compound is suspended or, most preferably, dissolved in an organic solvent. Useful organic solvents include hydrocarbons, ketones, aliphatic or aromatic hydrocarbons (e.g., benzene or toluene), kerosene, glycols (especially $C_2$- or $C_3$-glycols), ethers, alcohols, or mixtures thereof. Most preferably, the solvent should be miscible with water. The boiling point (at 1 atm) of the organic solvent is less than about 130° C., with a boiling point of less than about 100° C. being preferred. The lower the boiling point, the more efficient the spray drying step of the process. The organic solvent is preferably an alcohol, and most preferably is a $C_1$–$C_5$ alcohol because they are very effective in yielding high porosity, high volume area, and fine particle size powders. Moreover, when employing organometallic compounds, it is highly desirable to choose an organic solvent to produce an admixture which has R groups which are the same as the R group of the ester of the metal which is to be dissolved or suspended (e.g., an isopropanol solvent for a metal isopropoxide). Most preferably, organic solvent is added in an amount sufficient to completely dissolve the hydrolyzable metal compound to produce a solution. Production of a solution ensures homogeneity of the system, thus increasing the efficiency of production and the uniformity of the final product.

To the suspended or dissolved hydrolyzable metal compound is added a liquid comprising water. The amount of water added must be sufficient to at least partially hydrolyze the hydrolyzable metal compound. Although the water could be added to the hydrolyzable metal compound prior to the addition of the organic solvent, adding the water to the solution is clearly preferable to uniformly hydrolyze the hydrolyzable metal compound. The amount of water to be added depends on the reaction constituents being employed and the desired properties of the powder to be produced. Generally, the amount of water added is an amount necessary to substantially hydrolyze all of the hydrolyzable metal compound, and, in many instances the amount is the stoichiometric amount. However, the amount can range from at least about 10% of the stoichometric amount to amounts greater that the stoichiometric amount. An amount of water substantially above the stoichiometric amount tends to reduce the pore volume and surface area of the powders, and tends to increase particle size and the degree of agglomeration of the powders. Moreover, excessive amounts of water tend to increase the viscosity of and degree of settling of products from the admixture which reduces the ease of spray drying. Therefore, the amount of water should not exceed more than about 110% of the stoichiometric amount, and most preferably is no more than about the stoichiometric amount. The liquid comprising water may also include, for example, acid, base or alcohol. When a mixture of water and alcohol is added, the preferred alcohol to add to the water is selected from the group of $C_1$-$C_5$ alcohols.

As noted above, small amounts of acids and bases may be added to the admixture. They are added to control the pH of the admixture (gel or solution). The pH of the gel or solution is a factor which is responsible for controlling the size of the primary product particles. Most preferably, the pH of the admixture is maintained between about 2 and about 10 to produce primary product particles of a size less than about 1 $\mu$, usually 0.5 $\mu$ or less. Although the pH varies for each combination of reactants, one of ordinary skill in this art could determine the appropriate pH for each class of reactants by analyzing the admixture, for example, by sedimentation analysis, transmition electron microscopy or photo correlation spectoscopy to determine the presence of hydrolyzed metal compound.

Surfactants may also be added to the admixture. They are added to modify the physical properties of the metal oxide products. They include binders to increase the degree of ultimate packing of the particles, dispersants to reduce particle agglomeration in the suspension and consequently particle size in the product, sintering aids, etc.

An additional advantage of our novel process is the ability to add dopants to the admixture to enhance the utility of the final product. For example, $BaTiO_3$ is finding increasing utility in the electronics industry. However, conventional techniques of producing barium titanate suffer from the drawback of non-uniform levels of doping. Our process overcomes this drawback by producing a solution (homogeneous) which is subsequently hydrolyzed to produce a uniformly doped product.

The admixture is spray dried to produce the metal oxides. The term "spray drying" includes opened-cycle spray drying, closed-cycle spray drying, semi-closed-cycle spray drying and flash drying. Among these techniques, open, semi-closed and closed-cycle spray drying techniques are preferred. Although each of the techniques is well known to those of ordinary skill in this art, a basic description of the preferred techniques can be found in Masters, K., *Spray Drying Handbook*, The Pitman Press, Bath, U.K., 1979, pp. 3–6, 33–45. Spray drying of the admixture (preferably in a closed-cycle spray drying apparatus) unexpectedly yields metal oxide powders possessing unique properties as compared to powders produced from the other known spray drying techniques.

The admixture is introduced to the heating zone as a plurality of fine droplets. The droplet size is controlled primarily by the apparatus used to form the droplets and by the viscosity of the admixture. In most instances, the droplets have an effective diameter of not more than about 100 $\mu$. Although our invention contemplates the use of any known system capable of producing fine droplets (e.g., atomizing the admixture), such as spray nozzles of a variety of designs (e.g., pneumatic nozzles, sonic nozzles, and pressure nozzles) or rotary atomizers (such as rotating wheels or disks), rotating wheels or disks are preferred as evidenced by the Examples, although we believe that sonic nozzles may be more preferable. The viscosity of the admixture is influenced by such factors as the reactants employed, the temperature of the admixture when supplied to the droplet forming apparatus, the binders used (if any), the concentration of hydrolyzed metal compound in the solvent, and the amount of water used. The effects of these factors are illustrated in the Examples.

In our process, spray drying occurs in a heating zone at temperatures and pressures below the critical temperature and pressure of the organic solvent in the admixture. Moreover, the admixture viscosity, the feed rate, the air flow, and the inlet and outlet temperatures of the spray dryer will influence the properties of the final product. In addition, certain physical parameters of the apparatus such as the design, size and construction of the spray dryer (columnar or tower type, vortical or conical bottom, etc.) and the method of supplying the heating medium to the heating zone (co-current, counter-current, mixed flow, etc.) will influence the temperatures, pressures and residence time of the admixture within the heating zone and, consequently, the properties of the xerogel. One of ordinary skill in this art would recognize that any of a variety of combinations of the factors can be used provided, however, the energy within the heating zone is sufficient to remove substantially all of the organic solvent employed to produce the admixture which, in turn, yields the metal oxide product. The general relationship between the different operating parameters and the final product properties are well known and have been discussed in Masters, id, pp. 52, 43, 117–31, 141–43. However, whereas the inlet and outlet temperatures and the residence time of the admixture in the heating zone is important in controlling the primary particle size of products produced from other chemical systems (e.g., aqueous systems), the primary particle size of the oxides produced by our process is believed to be generally independent of these factors. Our work indicates that when primary particles are produced in suspension upon hydrolysis of the metal compound (especially metal alkoxides), they are generally $\leq 1$ $\mu$ and remain substantially unchanged on drying. Notwithstanding the above, the known relationships are important in determining the properties of the aggregates of primary particles which are produced. For example, as a general rule, the faster the rate of drying of the atomized droplets, the smaller the size of the aggregates of primary particles which are produced.

The products produced by our process are generally characterized as loosely agglomerated primary particles and/or aggregates of primary particles having a generally spherical form at the aggregate and primary particle level. As used herein, agglomerates are defined as a jumbled mass or collection of at least two more primary particles or aggregates held together by relatively weak cohesive forces. The agglomerates are generally between about 1 and 10 $\mu$ in effective spherical diameter (the diameter of a spherical mass having a volume equal to the volume of the agglomerate). Aggregates, as used herein, are defined as a dense mass of primary particles held together by strong intermolecular or atomic cohesive forces. Aggregates are generally between about 1 and 5 $\mu$ in effective diameter (the diameter of a spherical mass having a volume equal to the volume of the aggregate). A primary particle is defined as a discrete low porosity crystal such as a single crystal, polycrystal or a glass. As noted above, the primary particles are usually less than about 1 $\mu$ in diameter (effective) and ordinarily range from about 0.05–0.7 $\mu$ (in many instances 0.5 $\mu$) in diameter.

In the preferred embodiment illustrated in FIG. 1, the inlet temperature (the temperature of the drying medium when supplied to the heating zone) is at least about 120° C., preferably between about 140° C. and about 195° C., and the outlet temperature (the temperature of the heating medium removed with the product from the zone) is at least about 70° C., preferably at least about 80°-90° C. While the process may be performed at any pressure below that pressure at which the combination of pressure and temperature would be above the critical temperature and pressure, the process is most preferably carried out under a pressure of about 1 atm or less of drying medium (gas).

FIG. 1 schematically illustrates an indirect heated, closed cycle spray drying apparatus (operated by Bowen Engineering Inc., Somerville, N.J.) of the type preferably employed in producing our novel metal oxide powders. As illustrated, the gel (one form of the admixture) is supplied to a supply line 1. Compressed gas is applied via a line 2 to aid in feeding the admixture to the spray dryer. Optionally, cooling water is fed via a line 3 to cool the supply line 5 used to deliver the admixture to spray drying chamber 9, thus preventing premature vaporization of the admixture in the nozzle. Nitrogen (or some other "non-oxygen containing" gas; i.e., a gas having a maximum $O_2$ content less than or equal to about 0.1%, and preferably less than the lower explosion limit for the solvent) is supplied via a line 4 to the spray drying chamber 9 to function as the drying medium. In operation, the nitrogen is initially cycled through the system and thereafter continuously recycled with make-up nitrogen being supplied through the nozzle 4 as needed. The nitrogen is heated to the appropriate drying temperature in a preheater 7 (e.g., a steam heater) and is supplied (cocurrently) to the spray drying chamber 9 through a line 7 and circumferential supply opening 8. The gel is fed through the line 1 (via the compressed gas supplied through line 2) to the supply line 5 which feeds the gel through a nozzle 10. Within the spray drying chamber 9 is a rotating wheel or disk 11 which functions to atomize the gel. In spray drying chamber 9, a product comprising metal oxide powders, and vapors comprising water and organic solvent are produced from the gel. The product and vapors are pumped through outlet 12 and supply line 13 to a separater 14 (e.g., a cyclone separator) wherein the product is separated from the vapor. The product is removed from the separator via outlet 15. The vapor, containing reaction product fines is drawn off through take-off vent 16 and supplied by a line 17 through a nozzle 18 to a baghouse 19. In the baghouse 19, the product fines are collected and removed via outlet 20. The remaining vapor, essentially free of product, is removed from the baghouse via take-off 21 and is supplied via a line 22 to an absolute filter 23 (capable of removing ultrafine powders smaller than about 0.5 $\mu$). The clean vapor is supplied via a line 24, a primary fan 25, and a line 26 to a condenser 27 which functions to condense the organic solvent and water vapor. The remaining gas, primarily nitrogen, is fed to a demister 28 (wherein any remaining organic solvent and water vapor are condensed). The nitrogen gas, leaving the demister 28 is fed via line 29 by a secondary fan 30 and through a line 31 to the preheater 7, whereafter the cycle is repeated.

While the above detailed description of the apparatus illustrated in FIG. 1 represents applicants' preferred embodiment for operating the process, it will be apparent to those of ordinary skill in the art that many changes, modifications, additions and deletions may be provided without departing from the scope of the embodiment illustrated. Moreover, it will be apparent to those of ordinary skill in the art that many changes, modifications, additions, and deletions may be provided without departing from the scope of the basic invention.

Examples 1–16 illustrate the scope of the products which can be produced by our process, and various modifications of process parameters used to form the admixtures which are spray dried to produce the metal oxide products. Unless otherwise indicated, admixture preparation steps were conducted at room temperature (x21° C.).

EXAMPLE 1

An aluminum oxide was produced according to the following procedure. 10.8 liters of isopropanol was heated to 70° C. With vigorous stirring (Cowles® mixer), 3000 gm (14.7 mole) of aluminum isopropoxide (Chatham Chemicals) was added and stirred for 30 min. Over a period of about 15 min., a solution of 796 cc of deionized water (44.2 mole) in 2.7 liters of methanol was added to the alkoxide (the hydrolysis reaction is exothermic with a temperature rise of 5° to 10° C.). Using a 3 in. (7.6 cm), Cowles® mixer blade stirring was continued at ≈2000–3000 rpm for an additional 30 min. This procedure was repeated six times in order to synthesize about 10 lbs. of alumina. Some settling of this gel occured on standing overnight. It was easily redispersed using the Cowles® mixer. The suspension was poured through a 20 mesh screen into a large feed tank for supply to a spray dryer.

The suspension (gel), containing 10.0 wt% solids after screening, was spray dried in an indirect fired, closed cycle spray dryer (conical bottom type (76.2 cm diameter) BSLA dryer, Bowen Eng. Inc.) using a Centrifugal AT-4, 2″ CSE atomizer. The suspension was fed at ambient temperature to the atomizer at a rate of 239 g/min., and atomized under a force of 100 psig. The inlet temperature of the spray dryer was 150° C., the outlet temperature was maintained at 90° C.

EXAMPLE 2

An aluminum oxide was produced according to the following procedure. Into a covered 5 liter stainless steel pot, 500 g (1.93 mole) Aluminum sec-butoxide (95%, from Alfa) was added to 165 cc of sec-butanol. With constant stirring, the solution was heated to 40° C. and then another solution of 90 cc (5 moles) of deionized water in 500 cc of methanol was slowly added to the alkoxide. A 30° C. exotherm developed in the suspension as well as substantial gelation of the mixture. The extent of gelation can be controlled by the addition of additional alcohol and continued, vigorous stirring with a large propellor type stirrer. This suspension was mixed with a Cowles® mixer and screened through a 25 mesh screen prior to spray drying in a closed cycle spray dryer.

The suspension, containing 14.5 wt% solids after screening, was spray dried in the same equipment used for Example 1 under the same conditions, except the feed rate was 205 cc/min.

EXAMPLE 3

Spray dried magnesia was produced according to the following procedure. One Kg of Mg(OEt)$_2$ (Alfa Inorganic) was added to 8.5 l of absolute methanol and stirred for 15 min. with a Cowles® mixer. Using a separatory funnel, 325 cc of redistilled water was added dropwise to the cloudy suspension over a period of 15 min. The thick suspension was stirred an additional 15 min. This procedure was repeated an additional six times. Some settling occurred upon standing. The suspensions were stirred for an additional 15 min. with a Cowles® mixer and screened through a 25 mesh screen prior to spray drying.

The suspension, containing 7.5 wt% solids after screening, was spray dried in the same equipment used for Example 1. The operating conditions were also the same, except the outlet temperature was 80° C. and the feed rate was 194 cc/min.

EXAMPLE 4

Zirconium silicate was produced by the following process. Zirconium n-propoxide [1100 cc, 1.3 kg (4.0 mole), Alfa Inorganics] was dissolved in 1 gal. of isopropanol in a 5 gallon container. A solution of 608 gm (4.0 moles) of tetramethoxysilane (Petrarch Systems Inc.) in 1 liter of isopropanol was added to a solution of 600 cc isopropanol, 600 cc deionized water (33.3 moles), and 5 cc aqueous $NH_3$. With the added $NH_3$, there was very little time to add the silicon alkoxide to the zirconium solution. The zirconium solution (at room temperature) was vigorously stirred with a Cowles® mixer as the silicon alkoxide solution was added dropwise. (If the addition had proceeded over a long period of time, the mixture would have set to a firm gel. Addition of alcohol and vigorous stirring would have broken the gel to produce a thick suspension.) After additional mixing and screening (through a 25 mesh sieve), the suspension was ready for spraying in a closed cycle spray dryer.

The suspension, containing 9.0 wt% solids after screening, was spray dried in the same equipment used for Example 1. The operating conditions were also the same, except the inlet temperature was 140° C., the outlet temperature was 88° C. and the feed rate was 202 cc/min.

EXAMPLE 5

Spray dried yttria was produced as follows. 375 g (1.15 mole) of Y(acetate)$_3$:14% $H_2O$ (Alfa Inorganics) was slowly added to hot (45° C.) methanol. Slowly, 800 cc of deionized water was added (100 cc/min). The suspension, after having been strained through a 25 mesh screen, was ready to be spray dryed.

The screened suspension, containing 5.0 wt% solids, was spray dried using the apparatus for Example 1 under the following modified conditions: the outlet temperature was 75° C. and the feed rate was 216 cc/min.

EXAMPLE 6

Spray dried zirconia was produced by the following process. Using a propellor type stirrer, 750 cc of zirconium n-propoxide (2.29 mole) was added to 750 cc of isopropanol. With vigorous stirring, a solution of 500 cc water (28 mole) in 250 cc of isopropanol was slowly added. The suspension was stirred for 30 min. at room temperature. On another day it was screened and spray dried.

The screened suspension, containing 10.5 wt% solids, was spray dried in the apparatus used in Example 1 under the following modified conditions: the inlet temperature was 135° C.; the outlet temperature was 85° C.; and the feed rate was 123 cc/min.

EXAMPLE 7

Titanated silica was produced as follows. To a solution of 501 g of tetramethoxysilane (Petrarch Systems Inc.) in 3100 ml of absolute methanol was added 75 ml of ammonia solution (from 6.5 ml concentrated ammonium hydroxide diluted with 295 ml distilled water) and the mixture stirred for 20 minutes at ambient temperature. The solution was then stirred an additional 15 minutes after addition of 17.06 g Ti(OC$_3$H$_7$) (Alfa Inorganics).

The suspension was spray dried in a conical bottom BSLA spray dryer (Bowen Eng., Inc) equipped with a two-fluid nozzle (SS #5 setup). The spray dryer operating conditions were as follows: the inlet temperature was 140° C., the outlet temperature was 90° C., the atomization force was 60 psig., and the suspension (at ambient temperature) was fed at a rate of 232 cc/min.

EXAMPLE 8

Mixed oxides of calcium and aluminum were produced as follows. Aluminum i-propoxide (1109 g, Chatham Chemical) was added to 2270 ml of i-propanol. While the mixture was heated gradually to within the range 40°–45° C., a solution containing 66.1 g Ca(NO$_3$)$_2$. 4H$_2$O (Fisher) in 297 ml of distilled water was added. When the addition of the calcium nitrate solution was complete, the temperature of the mixture was around 82° C. The thick suspension was diluted with 875 ml of absolute methanol and finally stirred for 10 minutes at 60° C.

The suspension was spray dried using the apparatus described in Example 8 under the following modified conditions: the feed rate was 146 cc/min.

EXAMPLE 9

A preferred method for the production of the admixture needed to produce an 8 wt% Y$_2$O$_3$/ZrO$_2$ spray dried material is described herein. A clear solution of yttrium acetate was prepared by dissolving 247 g of the Y(acetate)$_3$. 3.5 H$_2$O (0.76 mole) in 500 cc (28 mole) of 90° C. distilled water. This solution was added to an equal volume of hot (80° C.) n-propanol. This solution must be kept hot during the synthesis. Using a heated dropping funnel, the yttrium solution was slowly added to 2.66 kg (6.3 mole) of zirconium n-propoxide. An air driven propellor stirrer was used throughout the addition, and the stirring continued for an extra 30 min. The suspension was quite thick and was improved by the addition of one gram of p-hydroxybenzoic acid (0.2 wt% of the ZrO$_2$) in 1.3 l of n-propanol to the zirconium alkoxide prior to the addition of the yttrium solution.

The suspension, containing 8.0 wt% solids after screening through a 25 mesh screen, was dried in the apparatus described in Example 1 under the following modified conditions: the inlet temperature was 140° C.; the outlet temperature was 89° C.; and, the feed rate was 235 cc/min.

EXAMPLE 10

Another preferred method for the production of the admixture necessary to produce an 8 wt% Y$_2$O$_3$/ZrO$_2$ spray dried material is described herein. Y(acac)$_3$ (ROC/RIC, 472 gm, 1.22 mole) was added to 4.03 kg (9.55 mole) of zirconium n-propoxide (Alfa Inorganics, 95 %) at 35° C. This slightly turbid solution was slowly added to a solution of 2.7 l of deionized water (150 mole), 3.75 liters of n-propanol, 45 cc of concentrated aqueous ammonia, and 1.5 gm of p-hydroxybenzoic acid. Stirring was maintained at 2000 rpm during the addition and for an extra 45 min. after the alkoxides were added.

The suspension was spray dried in the apparatus described in Example 1 under the following modified conditions: the inlet temperature was 140° C.; the outlet temperature varied between 115° C.–70° C.; and, the feed rate was 0.26 kg/min.

EXAMPLE 11

Mixed oxides of magnesium and aluminum oxide were produced as follows. 1.43 kg (7.0 mole) of aluminum isopropoxide was dissolved in 5 liters of isopropanol and heated for 30 min. at 65° C. in a 5 gallon (21.2 L) pot. While stirring, 403 gm (3.5 mole) of magnesium ethoxide was added to 400 cc of water, and this suspension was diluted with 10 liters of isopropanol. This magnesia suspension was slowly poured into the aluminum alkoxide solution. While stirring at 2000 rpm, the reaction mixture became very thick so it was necessary to thin this with additional isopropanol. After the addition was completed, the stirring was continued for another hour. A solution of 400 cc water (22.2 mole) in 1.5 liters of isopropanol was added dropwise to the hot suspension. The mixture was stirred for another 30 min. at 60° C. This suspension showed no significant settling on standing overnight. It was stirred (Cowles ® mixer) for one hour and screened through a 25 mesh screen.

The screened suspension, containing 10 wt% solids, was spray dried in the apparatus described in Example 1 under the following conditions: the inlet temperature was 140° C.; and the feed rate was 150 cc/min.

EXAMPLE 12

Barium titanate was spray dried as follows: $Ba(OH)_2 \cdot 8 H_2O$ (250.0 g, 0.792 moles; Allied Chemical) was added to 1600 cc of degassed, distilled water and heated to 75° C. under a blanket of flowing nitrogen gas. A solution of 248.51 g (0.817 mole) of titanium isobutoxide (Alfa Inorganics) dissolved in 1600 cc of sec-butanol was added dropwise to the barium solution. This suspension was vigorously stirred for 45 min. at 75° C. The next morning, the supernatant was filtered off (about 1 liter) and 3 liters of isopropanol was thoroughly mixed into the residue to produce a suspension suitable for spray drying.

The suspension was spray dried using the apparatus as described in Example 1 under the following modified conditions: the inlet temperature was 133° C.; the outlet temperature was 81° C.; and, the feed rate was 122 cc/min.

EXAMPLE 13

Calcium and zirconium doped $BaTiO_3$ was produced by the following procedure. The procedure of EXAMPLE 12 was modified to illustrate an additional feature of our invention. The procedure was altered to incorporate various dopants. In this example, the material of EXAMPLE 12 was doped with both calcium and zirconium ions using the following modification. 31.1 gm (0.095 mole) of zirconium n-propoxide was added to the titanium alkoxide. After the addition of the alkoxides was completed, calcium propionate (47 gm, 0.23 mole) in 500 cc of hot water was slowly added to the Ba/Zr/Ti slurry.

The suspension, containing 8.5 wt% solids after screening through a 25 mesh screen, was spray dried using the apparatus described in Example 1 under the following modified conditions: the outlet temperature was 88° C.; the feed rate was 228 cc/min; and the atomizing force was 90 psig.

EXAMPLE 14

Aluminum oxide was spray dried by the following procedure. A solution was formed from 2270 ml of i-propanol and 46.5 g of Polywet ® RC-54 (Uniroyal). To this solution was added 1109 g of aluminum i-propoxide (Chathem Chemical). Distilled water (262 g) was added dropwise producing a milk-white viscous gel. The mixture was stirred for 10 min. and then diluted with 72 ml of methanol. It was heated to 60° C. and held 15 minutes. It was then transferred to a gallon bottle.

The suspension was spray dried in the apparatus as described in Example 6 under the following modified conditions: the feed rate was 135 cc/min.

EXAMPLE 15

A known optimum composition for $Al_2O_3/ZrO_2$ is 15 vol% $ZrO_2$ with 2 mole percent of $Y_2O_3$ (based upon the $ZrO_2$). The final mole ratio of $Al_2O_3:ZrO_2:Y_2O_3$ is 0.773:0.167:0.0033, which amounts to 82 mole % $Al_2O_3$, 17.7 mole % $ZrO_2$ and 3.5% $Y_2O_3$.

A solution of 703 gm (670 cc) of $Zr(n-prop)_4$ (25% alcohol) and 1 liter of n-propanol was stirred at 40° C. while 25.5 gm of $Y(acac)_3$ (Roc/Ric Inorganics) was slowly added. The partially translucent suspension was then slowly added (poured) into a solution of 3806 gm (3935 cc) of ASB (aluminum sec-butoxide) previously heated to 60° C. in a 2 gal vessel. During the addition, the temperature slowly increased to 75° C. Heating was discontinued and the solution stirred for 30 min. This solution was slowly added (over one hour) to a 40° C. solution of 8 liters of n-propanol, 1400 cc distilled water and 100 cc of conc aqueous ammonia. The resulting suspension was stirred for an additional hour at 2000 rpm using a Cowles ® shear mixer. This procedure was repeated three times. The resultant suspension was spray dried after aging for less than three days.

The suspension, containing 9.5 wt% solids, was spray dried in the apparatus described in Example 1 under the following modified conditions: the inlet temperature was 140° C.; and, the feed rate was 177.7 g/min.

The physical properties of the spray dried powders of Examples 1–12, 14, and 15 are recited in Table 1 below.

TABLE 1

| Ex. No. | Surface Area m²/g a.s.[1] | Cal.[2] (°C.) | Pore Volume cc/g a.s. | Cal. (°C.) | Particle Size μ 50% ESD[3] | Density g/cc a.s. | Cal. (°C.) |
|---|---|---|---|---|---|---|---|
| 1 | 289 | — | 0.61 | — | — | — | — |
| 2 | 479 | 256 (800) | 2.3 | 2.4 (800) | 1.7 | 2.2 | 3.89 (1250) |
| 3 | 8.9 | — | 0.34 | — | 0.78 | 2.1 | — |
| 4 | 266 | — | 0.14 | — | 8.0 | 2.2 | — |
| 5 | 6.7 | — | 0.27 | — | 7.0 | — | — |
| 6 | 242 | 19 (800) | 1.65 | 0.74 (800) | 2.7 | — | — |

TABLE 1-continued

| Ex. No. | Surface Area m²/g a.s.[1] | Surface Area m²/g Cal.[2] (°C.) | Pore Volume cc/g a.s. | Pore Volume cc/g Cal. (°C.) | Particle Size μ 50% ESD[3] | Density g/cc a.s. | Density g/cc Cal. (°C.) |
|---|---|---|---|---|---|---|---|
| 7 | 961 | — | 0.49 | — | — | — | — |
| 8 | 744 | — | 2.1 | — | — | — | — |
| 9 | 185 | 8.8 (800) | 0.75 | 0.31 (800) | 2.8 | 2.4 | 5.5 (950) |
| 10 | 181 | 40 (700) | 0.18 | 0.13 (700) | 10 | 2.3 | 5.66 (700) |
| 11 | 213 | — | 2.48 | — | 1.6 | 2.1 | — |
| 12 | 70 | 11 (800) | 0.9 | 0.8 (1000) | — | — | — |
| 14 | 837 | — | 2.9 | — | — | — | — |
| 15 | 479 | 301 (950) | 1.4 | 1.1 (950) | 4.6 | 1.7 | — |

[1]a.s. = as sprayed
[2]Cal. (°C.) = Calcined at the reported temperature.
[3]50% ESD is the percentage of particles having an effective spherical diameter equal to or less than the reported value.

From the results in Table 1, some of the unique properties of products produced by our process are readily apparent. As compared to aluminum oxide xerogels produced from aquagels, aluminum oxide xerogels produced by our process (Examples 1, 2, 8 (modified with Ca), and 14) generally exhibit a pore volume greater than 2 cc/g and a surface area of greater than 400 m²/g. These properties are substantially higher than values obtained for aqueous xerogels and approach values obtained for aluminum oxide aerogels.

The following Examples illustrate an additional feature of our invention. Improved products can be produced by coating base materials with products produced from the admixed reactants.

EXAMPLE 16

10 gm of Mg(OEt)₂ (0.087 mole) was dissolved in 90 cc of methanol (with stirring for 5 min.). A mixture of 10 cc of methanol and 1.3 cc water (0.072 mole) was added dropwise from a separatory funnel, with vigorous stirring, and 350 gms (8.9 mole) of MgO (−48 mesh, NARCO) was added. This suspension was diluted to ½ gallon with sec-butanol.

The suspension, containing 11.5 wt% solids after straining through a 25 mesh screen, was spray dried using the apparatus described in Example 1 under the following conditions: the outlet temperature was 80° C.; and, the feed rate was 467 cc/min. The product produced by this procedure was MgO coated with aqueous agglomerates of MgO produced from alkoxide.

EXAMPLE 17

Since sterically hindered silicon alkoxides undergo hydrolysis at a much slower rate than simple alkoxides, a suspension was prepared in a manner similar to that described in Example 16 but with tetrabutoxysilane. To a 250 cc beaker was added 27.9 gm (0.087 mole) of tetrabutoxysilane, 100 cc of sec butanol, and 1.5 gm (0.083 mole) of deionized water in 10 cc of sec-butanol. This mixture was added to one liter of warm tert-butanol. 350 gms. of MgO(−48 mesh, NARCO) was added to this solution with vigorous stirring.

The suspension was spray dried in the apparatus described in Example 1. The operating conditions were not varied from those described in Example 1, except the feed rate was 333 cc/min. The product produced by this procedure was MgO coated at the high free energy locations (corners) with spherical silica produced from the alkoxide.

EXAMPLE 18

As a control, the process of Example 17 above was substantially repeated, but without any added silicon alkoxide. The only modifications were a reduced atomizing force (90 psig) and a higher feed rate (400 cc/min). The product produced by this process did not exhibit the formation of a coating on the surface of the substrate (MgO particles).

In order to demonstrate the differences between aqueous and non-aqueous spray drying, we prepared three different types of alumina containing suspensions for comparison. In addition, we prepared prior art solutions (aqueous suspensions) and solutions employed in our process for comparison. The processes are described in Examples 19–24 hereinbelow, and the results are illustrated in Table 2.

While there are some limits with regard to the differences between aqueous versus non-aqueous spray drying, there are also dramatic differences. Generally, non-aqueous spray drying is characterized by a material which displays a higher surface area, a much larger pore volume, somewhat finer particle size, a much lower bulk density, a greater degree of fluidity, and a definite change in texture in the individual particles as compared to powders produced by aqueous spray drying. To some extent, these differences are believed to be controlled by the source of the suspension which is sprayed. Nevertheless, there are a sufficient number of major differences in the macro and microscopic physical properties of these powders.

Each spray drying procedure in Examples 19–24, infra, was carried out in the apparatus described in Example 1, unless otherwise indicated. Each example indicates the inlet and outlet temperatures of the spray dryer and the feed rate of the suspension to the reaction zone.

EXAMPLE 19

269 gm of superground A-16 alumina (ALCOA, CM4422) was first wetted with 600 cc of distilled water. While stirring, 5.4 liters of isopropanol was added, and the mixture was shear-stirred with a Cowles® mixer (2500 rpm for 1 hr). Some settling had occurred over the 24 hr. period prior to spray drying. The suspension containing 10.5 wt% solids, was spray dried under the following conditions: inlet temp. = 140° C.; outlet temperature = 90° C.; feed rate = 247 cc/min.

EXAMPLE 20

400 gm of Alon (a fumed $Al_2O_3$ from Cabot) was first wetted with 400 cc of distilled water (as above—a critical step to assure proper dispersion) while stirring. Isopropanol (3.6 liters) was added with stirring and then shear-stirred at $\approx$3500 rpm for 1-2 hrs. Some settling occurred on standing overnight, but the suspension, containing 9.5 wt% solids, was re-established by additional shear mixing prior to spray drying under the following conditions: inlet temp. =140° C.; outlet temp. =90° C.; feed rate =325 cc/min.

EXAMPLE 21

500 gm of aluminum sec-butoxide (Alfa Inorganics) and 0.8 gm of magnesium ethoxide (ground to a powder) were stirred together for $\approx$1 hr. at 70° C. to yield a fine suspension. This hot mixture was slowly added to 360 cc of water (also at 70° C.) while stirring at $\approx$2500 rpm with the Cowles ® mixer (3 in. blade). An additional 700 cc of sec-butanol had to be added to maintain a pourable suspension. Ten cc of glacial acetic acid was slowly added to the suspension (to peptize the alumina) and stirring was continued for 2 hrs. Next, an additional 2540 cc of sec-butanol was added. The suspension, containing 3 wt% solids, was spray dried under the following conditions: inlet temp. =140° C.; outlet temp. =90° C.; feed rate =300 cc/min.

EXAMPLE 22

A wetted alumina prepared as in Example 19 above was dispersed in 6 liters of distilled water. Some settling occurred overnight, but the material was redispersed with a Cowles ® mixer and screened through a 20 mesh screen prior to drying in an open cycle drier. The open cycle spray dryer employs the same dryer as is employed in the closed cycle system described in Example 1. However, the operating conditions are significantly different.

The suspension (containing 3 wt% solids) was spray dried (open cycle) under the following conditions: inlet temperature =210° C.; outlet temperature =117° C.; feed rate 120.5 cc/min.

EXAMPLE 23

A wetted alumina prepared as in Example 20 above, was dispersed in 4 liters of deionized water. Prior to drying, the suspension was redispersed and screened as in Example 20 above. The suspension, containing 9 wt% solids, was dried in the open cycle dryer under the following conditions: inlet 260° C.; outlet temp. =130° C.; feed rate 180 cc/min.

EXAMPLE 24

The aluminum sec-butoxide suspension of Example 21 was added to 3600 cc of deionized water at 70° C. in place of the sec-butanol. Acetic acid was used again to peptize the alumina. The suspension, containing 4.5 wt% solids, was redispersed with a Cowles ® mixer prior to spraying in the open cycle dryer under the following conditions: inlet temp. =295 C; outlet temp. =138° C.; feed rate =169 cc/min.

TABLE 2

| | Sample No. | | | | | |
|---|---|---|---|---|---|---|
| | 19 | 22 | 20 | 23 | 21 | 24 |
| Source of $Al_2O_3$ | A-16 | A-16 | Fumed | Fumed | Alkoxide | Alkoxide |
| Dryer | Closed | Open | Closed | Open | Closed | Open |
| Pore Vol. cc/g | .3 | .34 | 1.7 | .93 | 1.6 | .33 |
| Surface Area $m^2/g$ | 13.3 | 8.9 | 94 | 97 | 383. | 317. |
| Particle Size Microns | 0.54 | 0.78 | 1.1 | 4.4 | 2.8 | 4.8 |
| Density, g/cc | | | | | | |
| He pychnometry | 3.9 | 3.5 | 3.5 | 3.4 | 2.1 | 2.7 |
| tap density | 0.6 | 0.58 | 0.22 | 0.34 | 0.24 | 0.65 |
| X-Ray | cryst $Al_2O_3$ | cryst $Al_2O_3$ | — | — | boehmite | boehmite |
| SEM[1] | 1-5μ irreg.[2] agglm.[3] | 1-5μ irreg. agglm. | 1-10μ dense sphs.[4] | 2-8μ dense sphs. | 2-10μ mixed sphs. | 1-5μ mixed & agglm. |
| Dryer Cond. | | | | | | |
| Inlet T° C. | 140 | 210 | 140 | 260 | 140 | 295 |
| Outlet T° C. | 90 | 117 | 90 | 130 | 90 | 138 |

Figure 2A:
FIGS. 2a, 2b, and 2c are photographs of an aluminum oxide produced by our process. The left half of each of FIGS. 2a and 2b indicate the portion of the sample illustrated in the blow-up (right half of each Figure). The magnification is shown in each figure as is the size bar.
Figure 2B:
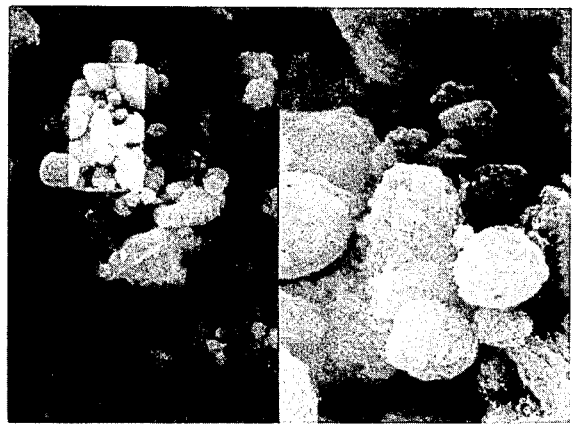
Figure 2C:
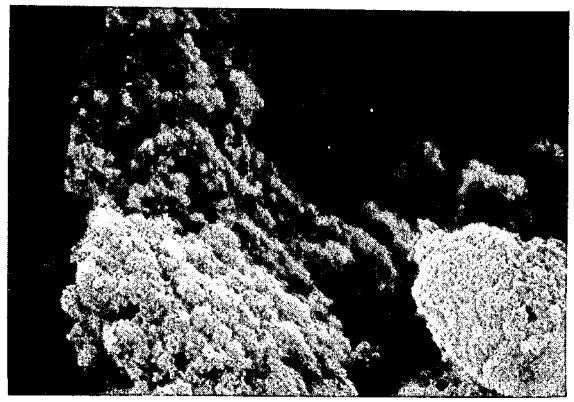
Figure 3A:
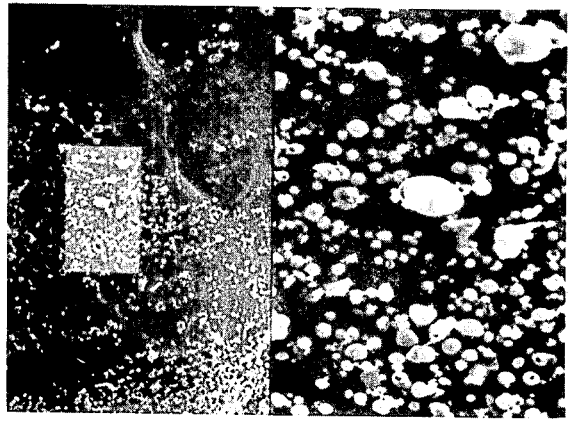
FIGS. 3a, 3b, and 3c are comparative photographs of an alimunum oxide produced by the prior art process of aqueous spray drying. As with FIGS. 2a and 2b, FIGS. 3a and 3b are divided in half; the left half indicating the portion of the sample in the blow-up (right half).
Figure 3B:
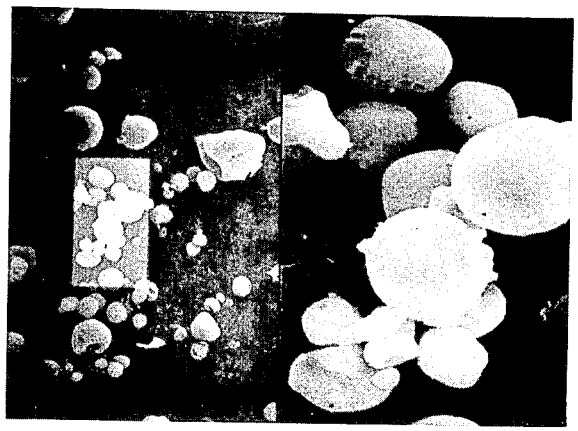
Figure 3C:
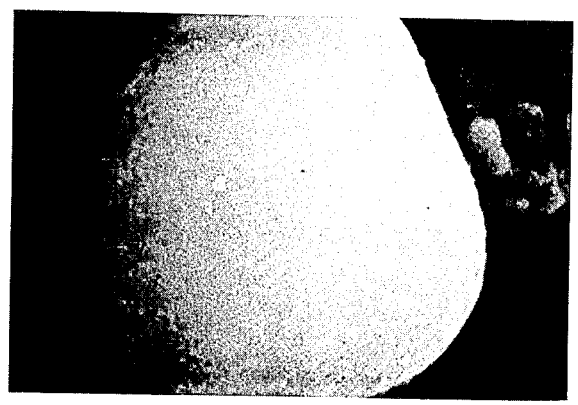
Figure 4A:
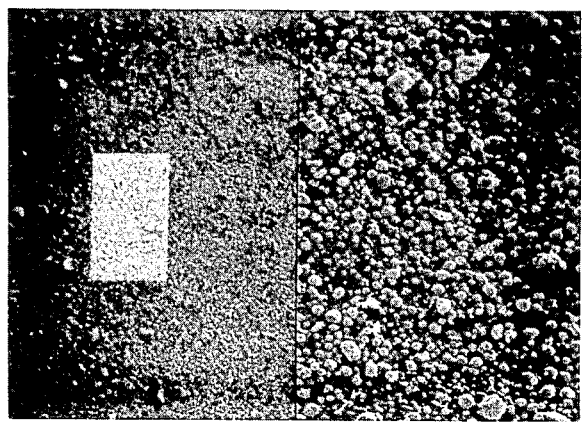
FIGS. 4a, 4b, and 4c are photographs of a yttria stabilized zirconia product produced in accordance with our process.
Figure 4B:
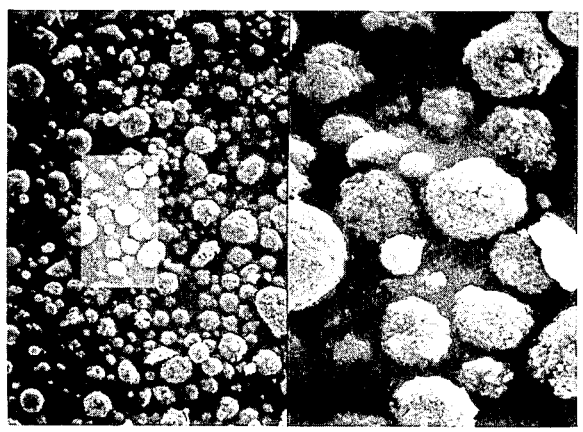
Figure 4C:
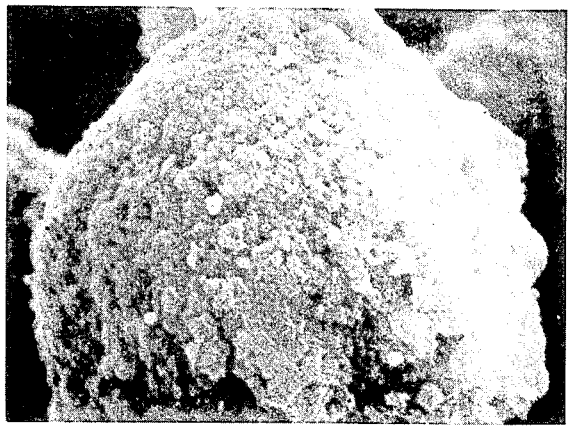
Figure 5A:
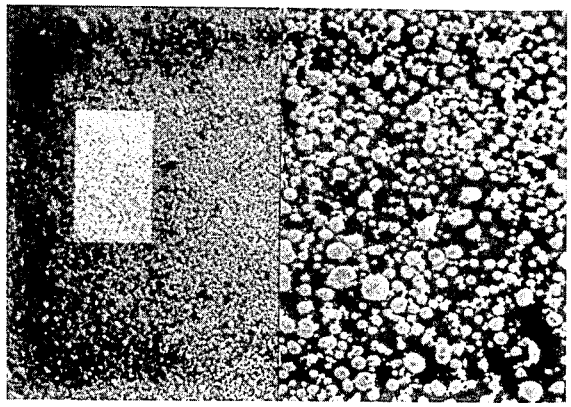
FIGS. 5a, 5b, and 5c are comparative photographs of a yttria-zirconia product produced by an aqueous spray drying process.
Figure 5B:
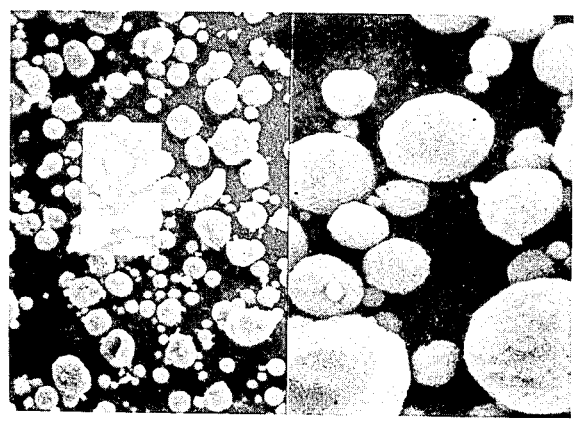
Figure 5C:
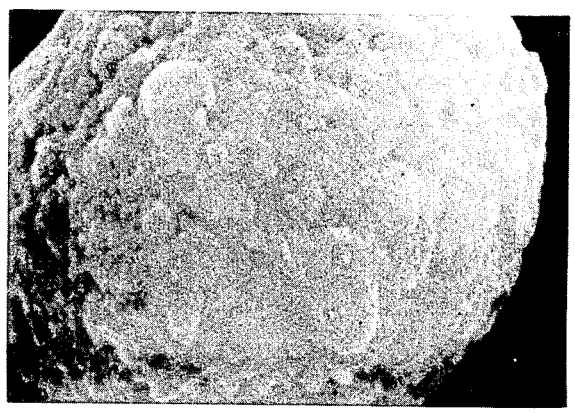

[1] scanning electron microscope
[2] irreg. = irregular
[3] agglm. = agglomerate
[4] sphs. = spheres As shown in Table 2, the powders derived from suspending a commercial fine powder in a mixture of alcohol and water or in water alone show inferior properties. (Examples 19, 20, 22, and 23). It is believed that the properties of these powders are largely controlled by the raw material itself. However, aluminas derived from alkoxides (Example 21, illustrated in FIGS. 2a, 2b, and 2c, and Example 24, illustrated in FIGS. 3a, 3b, and 3c) exhibit an increased surface area as compared to nonhydrolyzable metal compounds. In addition, differences in the properties of the alkoxide-derived oxides are clearly apparent depending upon the admixture used. In each of Examples 21 and 24, the alkoxide/alcohol a fine particle aluminum oxide (less than $\approx$0.2 μ) in suspension. When spray dried in the presence of alcohol, the product appears to exist as aggregates of very fine primary particles ($\leq$about 0.2 μ size, FIG. 2c). Moreover, the surface of these aggregates (FIG. 2b and 2c) appears to resemble a much looser assembly of particles than that of the powder produced from the purely aqueous suspension (FIG. 3b and 3c). In the latter case, we observe somewhat larger particles which appear to have a dense structure. Additionally, aluminas derived from alkoxides in a non-aqueous medium also exhibit a significant increase in surface area and a reduced density (by He pyrometry). Furthermore, as between aqueous and non-aqueous spray drying in accordance with our invention, non-aqueous spray drying offers unexpected improvements in both the pore volume and the surface area of the spray dried products.

Examples 25 and 26 hereinbelow describe processes for spray drying yttria stabilized zirconia in accordance with our process (using the preferred closed cycle spray dryer) as compared to spray drying process employing aqueous suspensions, Examples 27 and 28 hereinbelow. The results are set forth in Table 3.

EXAMPLE 25

46 gm $YCl_3.6H_2O$ (0.15 moles) and 400 gm of $ZrOCl_2 \cdot H_2O$ (1.6 moles) (both materials from Alfa Inorganics) were dissolved in 2 liters of distilled water (Millipore treated). This turbid solution was added (via a dropping funnel) to another solution of 300 cc of concentrated $NH_4OH$ in 6 liters of distilled water. The fluffy, white precipitate was allowed to stand overnight. Not much settling occurred, and attempts to filter the solid through coarse filter paper proved to be a slow, tedious process. The solid was suspended and was washed five times with water in order to remove the excess chloride ion. The solid was washed twice with isopropanol prior to suspending the slurry with about 2.5 gallon of isopropanol. During the next 24 hrs. some settling occurred so that another gallon of solvent could be poured off and replaced with pure isopropanol. This suspension was stirred with a Cowles ® mixer for about 3 hrs. The mixture was screened through 25 mesh screen prior to spraying.

The suspension, containing 15.0 wt% solids, was sprayed in the apparatus as described in Example 1, under the following modified conditions: the atomizing force was the force generated at 50,000 rpm; the inlet temperature was 103° C.; the outlet temperature was 70° C.; and, the feed rate was 269 cc/min.

EXAMPLE 26

This preparation was similar to Example 25 above, but performed at twice the scale (When Example 26 was originally dried, the heater for the dryer failed and thus the relatively low drying temperature of 105° C.). The procedure was repeated in order to obtain material dried at a drying temperature of 140° C. With the difficulty in filtering the previous preparation, we used successive washings and decantations with distilled water. The early washings added $NH_4OH$, but this eventually produced a cloudy layer which did not settle. Elimination of the $NH_4OH$ produced a better separation. A total of four gallons of isopropanol was added to the slurry prior to spraying.

The suspension, containing 4.5 wt% solids after straining through a 25 mesh screen, was spray dried in the apparatus described in Example 1 under the modified conditions as follows: the inlet temperature was 140° C.; and, the feed rate was 170.2 cc/min.

EXAMPLE 27

Using the same scale as in Example 26, 92 gm of $YCl_3.6 H_2O$ (0.3 moles) and 800 gm $ZrOCl_2$ (3.2 moles) were dissolved in 11 liters of distilled water. Once again 300 gm of $NH_4OH$ in 1.7 liters of water was added via a dropping funnel over a period of 30 min. Additional $NH_4OH$ was added until the solution was quite basic. The suspension was washed and decanted with successive amounts of water. A small amount of a dilute solution of p- hydroxybenzoic acid was added to disperse the solids. 2.6 gallons of this aqueous suspension, containing 7 wt% solids, was dried using the apparatus described in Example 20 (open cycle) at an inlet temperature of 225° C. and an outlet temp. of 178° C., and at a feed rate of 132 cc/min.

EXAMPLE 28

This experiment was similar to Example 27, but at half the scale and with added HCl to maintain the acidity. 46 gm $YCl_3.6 H_2O$ and 400 gm $ZrOCl_2$ were dissolved in 8 liters of water to 200 cc $NH_4OH$ in 1500 cc $H_2O$, and stirred at 3500 rpm with the Cowles ® mixer. The suspension was repeatedly washed and decanted with water. 60 cc of concentrated HCl was added to bring the suspension to a pH of 2. 0.39 gm of p-hydroxybenzoic acid in 5 cc of absolute ethanol was added. This suspension (2 gallons) was sprayed in the open cycle dryer at an inlet temperature of 225° C. and an outlet temperature of 178° C., at a feed rate of 155 cc/min.

TABLE 3

| | Example No. | | | |
|---|---|---|---|---|
| | 26 | 25 | 27 | 28 |
| Source[1] | CL (alc) | CL (alc) | CL (aq) | CL + HCl (aq) |
| Dryer | Closed | Closed | Open | Open |
| Pore Volume, cc/g | 0.34 | 1.4 | .13 | .07 |
| Surface Area, $m^2/g$ | | | | |
| a.s.[2] | 200. | 219. | 4. | <1. |
| cal[3] (700° C.) | 75 | 74. | — | 20. |
| Density, g/cc | | | | |
| He Pycnometry | | | | |
| a.s. | 3.2 | 3.2 | 4.4 | 3.8 |
| cal (700° C.) | 6.1 | — | — | — |
| Bulk | — | 0.25 | 1.9 | — |
| Particle Size, μ | | | | |
| a.s. | 5.3 | 3.2 | 5.8 | 4.9 |
| cal (700° C.) | 3.4 | — | — | — |
| SEM, Microns | 1–4 | .5–5 Sphs.[4] | 1–6 Sphs. | .3–4 |
| Morphology | "Loose Aggreg."[5] | | "Dense Aggreg." | |
| Texture | "Free Flowing" | | "Cakey" | |
| X-ray | Cubic | Cubic | Cubic | Tetragonal |

[1]Cl (alc) = prepared from alcohol suspension of the chloride salts ($YCl_3 + ZrOCl_2$); Cl (aq) = prepared from aqueous solution of the chloride salts; Cl + HCl (aq) = a similar preparation as in Example 24 but with the addition of HCl (to a pH = 2) prior to drying.
[2]a.s. = as sprayed
[3]cal = calcined at
[4]sphs. = spheres
[5]aggreg. = aggregate As shown in Table 3 above (and as illustrated in FIGS. 4a, 4b, and 4c, and FIGS. 5a, 5b, and 5c) for the yttria/zirconia (Y/Zr) system, substantial differences in surface area, pore volume, bulk density, particle size, and morphology are observed. The direction of the differences derived by our process (FIGS. 4a, 4b, and 4c) vs. an aqueous process (FIGS. 5a, 5b, and 5c) is the same as that observed for other oxides (e.g., the aluminas). The difference in surface area between the aqueous and non-aqueous routes (clearly illustrated in FIGS. 4c and 5c, respectively) is a critical factor in handling the powder.

EXAMPLE 29

Aluminum isopropoxide (Chatham Chemical Co.) was suspended in 5.4 l of isopropanol. The mixture was heated with stirring to 70° C. at which temperature most of the AIP dissolved, forming a hazy solution. The temperature was held for 60 minutes and then 452 mL of D.I. water were added. A thick precipitate formed immediately upon addition of the water. After an additional 5 minutes at temperature, 1.35 l of methanol were added. Stirring was continued for 30 minutes. Spray drying of the wet alumina gels was carried out using an indirectly-heated, closed-cycle dryer because of the flammable organic solvent involved. Before spray drying, the mixture was agitated using a Cowles ® mixer for 15 minutes and then poured through a 25 mesh screen. The physical properties of the spray dried alumina, as a function of operating conditions, are summarized in Table 4.

TABLE 4

| Drying No. | Spray Dryer Conditions | | Nozzle Pressure psig | Surface Area $m^2/g$ | Pore Volume $cm^3/g$ |
|---|---|---|---|---|---|
| | Temperature, °C. | | | | |
| | Inlet | Outlet | | | |
| 1 | 120 | 75 | 60 | 657 | 2.32 |
| 2 | 120 | 75 | 40 | 530 | 1.95 |

From the results obtained from the two runs reported in Table 4, it appears that an increase in nozzle pressure (at constant temperatures) will increase the surface area and pore volume. As noted heretofore, the use of a spray nozzle clearly produces an acceptable product even though the use of a centrifugal atomizing wheel is preferred. The enhanced utility of a product produced by our process is illustrated in the following Example.

EXAMPLE 30

Aluminum isopropoxide (Chatham Chemical Co.) (943 g) was suspended in 6.0 l of isopropanol. The mixture was heated with stirring to 70° C. at which temperature most of the AIP dissolved, forming a hazy solution. The temperature was held for 30 minutes and the 250 ml of D.I. water were added. A thick precipitate formed immediately upon addition of the water. After an additional 30 minutes at temperature, 1.5 l if methanol were added. Stirring was continued for 15 minutes at 70° C. Spray drying of the wet alumina gels was carried out using an indirectly-heated, closed-cycle dryer. The physical properties of the spray dried alumina, as a function of operating conditions, are summarized in Table 5.

TABLE 5

| Spray Dryer Conditions | | | | |
|---|---|---|---|---|
| Temperature °C. | | Nozzle Pressure PSIG | Surface Area $m^2/g$ | Pore Volume $cm^3/g$ |
| Inlet | Outlet | | | |
| 140 | 90 | 60 | 797 | 2.48 |

The sample was calcined in flowing oxygen in a tube furnace, using a 4-hour program to reach 700° C. Another portion of the same alumina sample was calcined at 550° C. The surface areas and the pore volumes, as a function of calcination temperature, are recited in Table 6 and indicate that an increase in calcination temperature yields a dramatically different particle (substantially lower in surface area coupled with a somewhat reduced pore volume). More specifically, it appears from this example that the pores tend to coalesce, thus reducing the surface area to a much greater extent than the pore volume.

TABLE 6

| Calcination Temperature °C. | Surface Area $m^2/g$ | Pore Volume $cm^3/g$ |
|---|---|---|
| 550 | 505 | 3.27 |
| 700 | 397 | 3.03 |

An ethylene polymerization catalyst was prepared from the 700° C. calcined material by contacting the support with $TiCl_4$ in heptane at 25° C. The dried, impregnated catalyst was tested for polymerization activity in a 2-L SS autoclave reactor. Conditions included 1 L isobutane, 85° C., 1 hour, 37.4 atm total pressure. The catalyst was run at two $H_2/C_2H_4$ ratios with the results reproduced in Table 7 (Run Nos. 1 & 2)..

TABLE 7

| Run No. | Pressure, atm. | | Productivity g PE/g cat-h | Melt Index | |
|---|---|---|---|---|---|
| | $H_2$ | $C_2H_4$ | | $I_{22}$ | $I_5$ |
| 1 | 10.2 | 12.4 | 2391 | 9.53 | 0.65 |
| 2 | 11.5 | 11.5 | 1728 | 23.5 | 1.62 |
| 3 | 13.7 | 9.8 | 1006 | 11.4 | 0.62 |
| 4 | 11.1 | 13.0 | 2941 | 11.8 | 0.82 |

The polymerization activity (productivity, Run 1 and Run 2) is higher than that of prior art $TiCl_4$ catalysts based on aqueous spray dried alumina (e.g., Ketjen ® NFF, Run 3) but not as high as alumina aerogel catalysts (Run 4).

EXAMPLE 31

A comparison of a variety of properties of an alumina aerogel and of a spray dried alumina xerogel, each produced from the same suspension, are reported in Table 8 below.

TABLE 8

| Analysis summary | Spray Dried | |
|---|---|---|
| | as is (150° C.) | Calcined 800° C. |
| init bulk density | 0.11 | 0.13 |
| tap bulk density | 0.15 | 0.16 |
| wt. loss, calcination | — | 40.6% |
| He pycn. density | 1.79 | 3.30 |
| pore volume | 2.86 | 2.43 |
| Surf Area | 580. | 201. |
| ESD (μ), 50%[1] | 0.8 | 1.1 |
| % C/% H | 6.0/3.3 | .21/.11 |
| Fluidity | very free flowing | similar |

| Analysis summary | Aerogel | |
|---|---|---|
| | as is (300° C.) | Calcined 800° C. |
| init bulk density | .076 | .067 g/cc |
| tap bulk density | .093 | .095 g/cc |
| wt. loss, calcination | — | 12.0% |
| He pycn. density | 3.00 | 3.84 g/cc |
| pore volume | 2.2 | 2.4 cc/g |
| Surf Area | 222. | 224. $m^2/g$ |
| ESD (μ), 50% | <.6 | — |
| % C, % H | .74/1.03 | .16/.39 |
| Fluidity | fluffy, free flowing | similar |

[1]ESD (μ), 50% = the maximum value of the effective spherical diameter of about 50% of the total number of primary particles.

Table 8 clearly illustrates the similarity in properties obtained by our process as compared to an aerogel. Of particular importance is the similarity in fluidity of both samples which indicates the utility of our spray dried materials as, for example, thickeners (cf. Cab-O-Sil ®).

EXAMPLE 32

The effect of aging of an alumina gel sample (prepared by hydrolsis of alkoxide in isopropanol) on the final properties of the spray dried xerogel are reported in Table 9 below.

TABLE 9

| Age (days) | SA¹ m²/g | PV² g/cc | Dens. g/cc | ESD (μ) 50% |
| --- | --- | --- | --- | --- |
| 0 | 604 | 2.61 | 2.23 | 2.0 |
| 2 | 892 | 2.33 | 2.01 | 3.0 |
| 9 | 612 | 2.64 | 2.20 | 2.9 |

TABLE 9-continued

| Age (days) | SA¹ m²/g | PV² g/cc | Dens. g/cc | ESD (μ) 50% |
| --- | --- | --- | --- | --- |
| 35 | — | 2.38 | 1.82 | — |

¹SA = surface area
²PV = pore volume
³ESD (μ), 50% = the maximum value of the effective spherical diameter spherical diameter of about 50% of the total number of primary particles.

These results suggest a slight growth of the final product particles as the aging of the gel increases, but the gel does not appear to have undergone any substantial changes on aging. It is belived that for this system, the particle growth has ceased due to the rapid rate of hydrolysis of the metal compound (i.e., hydrolysis of the metal compound was substantially complete prior to aging).

We claim:

1. A yttria-stabilized zirconia xerogel having a pore volume of at least 1.4 cc/g and a surface area of at least 219 m²/g.

* * * * *